United States Patent [19]

Andresen

[11] Patent Number: 5,673,297

[45] Date of Patent: Sep. 30, 1997

[54] METHOD OF MITIGATING STRESS CORROSION CRACKING OF METALS IN HIGH-TEMPERATURE WATER BY CONTROL OF CRACK TIP PH

[75] Inventor: Peter Louis Andresen, Schenectady, N.Y.

[73] Assignee: General Electric Company, Schenectady, N.Y.

[21] Appl. No.: 509,280

[22] Filed: Jul. 31, 1995

Related U.S. Application Data

[63] Continuation-in-part of Ser. No. 224,896, Apr. 8, 1994, abandoned.

[51] Int. Cl.[6] .................................................. G21C 9/00
[52] U.S. Cl. .................................................. 376/306
[58] Field of Search .................................. 376/306, 305

[56] References Cited

U.S. PATENT DOCUMENTS

| | | | |
|---|---|---|---|
| 4,926,449 | 5/1990 | Burda | 376/306 |
| 4,992,232 | 2/1991 | Cowan, II et al. | 376/306 |
| 5,108,697 | 4/1992 | Esposito et al. | 376/306 |
| 5,398,268 | 3/1995 | Ibe et al. | 376/306 |

FOREIGN PATENT DOCUMENTS 195 12 918
A1 10/1995 Germany.

OTHER PUBLICATIONS

Szklarska–Smialowska, et al. "Mechanism of Crack Growth in alloy ..." Corrosion Science, vol. 50 No. 9, Sep. 1994, Houston, USA, pp. 676–681.

Patent Abstracts of Japan, vol. 011, No. 282, 11 Sep. 1987 & JP-A-62 080285 (Sumitomo Metal Ind Ltd), 13 Apr. 1987, abstract.

*Primary Examiner*—Daniel D. Wasil
*Attorney, Agent, or Firm*—Nixon & Vanderhye

[57] ABSTRACT

A method for mitigating initiation or propagation of a crack in a surface of a metal component in a boiling water reactor. The method includes the step of injecting a solution or suspension of a pH-adjusting compound into the bulk water of the reactor. The compound has the property of changing the pH of high-temperature water inside the crack from a value outside a predetermined pH range (namely, pH 6.0 to 8.0) to a value within the predetermined pH range without causing any significant change of the bulk water pH. The growth rate of the crack when the crack pH is outside the predetermined pH range is greater than the growth rate of the crack when the crack pH is within the predetermined pH range.

8 Claims, 12 Drawing Sheets

METHOD OF MITIGATING STRESS CORROSION CRACKING OF METALS IN HIGH-TEMPERATURE WATER BY CONTROL OF CRACK TIP PH

This application is a continuation-in-part of application Ser. No. 08/224,896 filed Apr. 8, 1994, now abandoned.

FIELD OF THE INVENTION

This invention relates to methods for controlling stress corrosion cracking of metal components exposed to high-temperature water. As used herein, the term "high-temperature water" means water having a temperature of about 150° C. or greater. High-temperature water can be found in a variety of known apparatus, such as water deaerators, nuclear reactors, and steam-driven power plants.

BACKGROUND OF THE INVENTION

Nuclear reactors are used in electric power generation, research and propulsion. A reactor pressure vessel contains the reactor coolant, i.e. water, which removes heat from the nuclear core. Respective piping circuits carry the heated water or steam to the steam generators or turbines and carry circulated water or feedwater back to the vessel. Operating pressures and temperatures for the reactor pressure vessel are about 7 MPa and 288° C. for a boiling water reactor (BWR), and about 15 MPa and 320° C. for a pressurized water reactor (PWR). The materials used in both BWRs and PWRs must withstand various loading, environmental and radiation conditions.

Some of the materials exposed to high-temperature water include carbon steel, alloy steel, stainless steel, and nickel-based, cobalt-based and zirconium-based alloys. Despite careful selection and treatment of these materials for use in water reactors, corrosion occurs on the materials exposed to the high-temperature water. Such corrosion contributes to a variety of problems, e.g., stress corrosion cracking, crevice corrosion, erosion corrosion, sticking of pressure relief valves and buildup of the gamma radiation-emitting Co-60-isotope.

Stress corrosion cracking (SCC) is a known phenomenon occurring in reactor components, such as structural members, piping, fasteners, and welds, exposed to high-temperature water. As used herein, SCC refers to cracking propagated by static or dynamic tensile stressing in combination with corrosion at the crack tip. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, crevice geometry, heat treatment, and radiation can increase the susceptibility of metal in a component to SCC.

It is well known that SCC occurs at higher rates when oxygen is present in the reactor water in concentrations of about 1 ppb or greater. SCC is further increased in a high radiation flux where oxidizing species, such as oxygen, hydrogen peroxide, and short-lived radicals, are produced from radiolytic decomposition of the reactor water. Such oxidizing species increase the electrochemical corrosion potential (ECP) of metals. Electrochemical corrosion is caused by a flow of electrons from anodic to cathodic areas on metallic surfaces. The ECP is a measure of the thermodynamic tendency for corrosion phenomena to occur, and is a fundamental parameter in determining rates of, e.g., SCC, corrosion fatigue, corrosion film thickening, and general corrosion.

In a BWR, the radiolysis of the primary water coolant in the reactor core causes the net decomposition of a small fraction of the water to the chemical products $H_2$, $H_2O_2$, $O_2$ and oxidizing and reducing radicals. For steady-state operating conditions, equilibrium concentrations of $O_2$, $H_2O_2$, and $H_2$ are established in both the water which is recirculated and the steam going to the turbine. This concentration of $O_2$, $H_2O_2$, and $H_2$ is oxidizing and results in conditions that can promote intergranular stress corrosion cracking (IGSCC) of susceptible materials of construction. One method employed to mitigate IGSCC of susceptible material is the application of hydrogen water chemistry (HWC), whereby the oxidizing nature of the BWR environment is modified to a more reducing condition. This effect is achieved by adding hydrogen gas to the reactor feedwater. When the hydrogen reaches the reactor vessel, it reacts with the radiolytically formed oxidizing species homogeneously and on metal surfaces to reform water, thereby lowering the concentration of dissolved oxidizing species in the water in the vicinity of metal surfaces. The rate of these recombination reactions is dependent on local radiation fields, water flow rates and other variables.

The injected hydrogen reduces the level of oxidizing species in the water, such as dissolved oxygen, and as a result lowers the ECP of metals in the water. However, factors such as variations in water flow rates and the time or intensity of exposure to neutron or gamma radiation result in the production of oxidizing species at different levels in different reactors. Thus, varying amounts of hydrogen have been required to reduce the level of oxidizing species sufficiently to maintain the ECP below a critical potential required for protection from IGSCC in high-temperature water. As used herein, the term "critical potential" means a corrosion potential at or below a range of values of about −230 to −300 mV based on the standard hydrogen electrode (SHE) scale. IGSCC proceeds at an accelerated rate in systems in which the ECP is above the critical potential, and at a substantially lower or zero rate in systems in which the ECP is below the critical potential. Water containing oxidizing species such as oxygen increases the ECP of metals exposed to the water above the critical potential, whereas water with little or no oxidizing species present results in an ECP below the critical potential.

Figure 1:
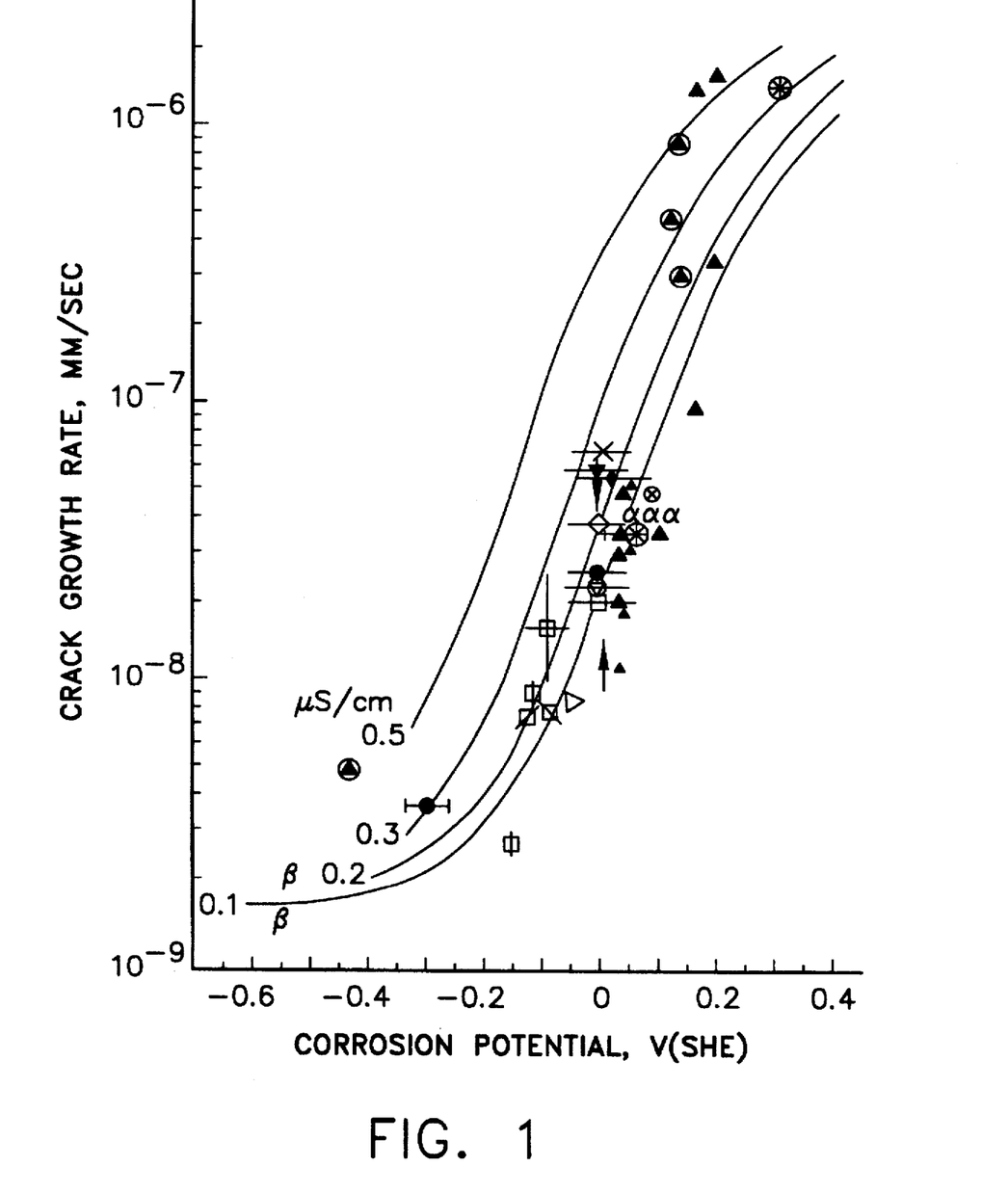
FIG. 1 shows the observed and predicted crack growth rate as a function of corrosion potential for furnace-sensitized Type 304 stainless steel in 288° C. water.
Figure 2:
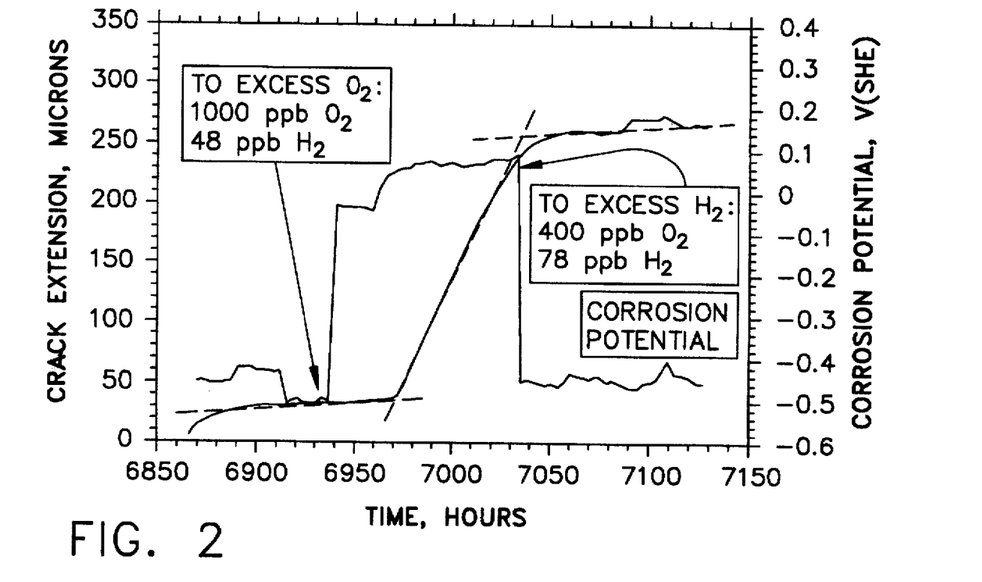
FIG. 2 is a plot of crack length vs. time for a Pd-coated CT specimen of sensitized Type 304 stainless steel in 288° C. water containing about 400 ppb oxygen and 0.1 µM $H_2SO_4$.

Thus, susceptibility to SCC in BWRs is highly influenced by corrosion potential. FIG. 1 shows the observed and predicted crack growth rate as a function of corrosion potential for furnace-sensitized Type 304 stainless steel at 27.5 to 30 MPa√m in 288° C. water over the range of solution conductivities from 0.1 to 0.5 µS/cm. Data points at elevated corrosion potentials and growth rates correspond to irradiated water chemistry conditions in test or commercial reactors. Reduction of the corrosion potential is the most widely pursued approach for mitigating SCC in existing plants. The fundamental importance of corrosion potential versus, e.g., the dissolved oxygen concentration per se is shown in FIG. 2, where the crack growth rate of a Pd-coated CT specimen drops dramatically once excess hydrogen conditions are achieved, despite the presence of a relatively high oxygen concentration. FIG. 2 is a plot of crack length vs. time for a Pd-coated CT specimen of sensitized Type 304 stainless steel showing accelerated crack growth at ≈0.1 µM $H_2SO_4$ in 288° C. water containing about 400 ppb oxygen. Because the CT specimen was Pd-coated, the change to excess hydrogen caused the corrosion potential and crack growth rate to drop.

However, in the evolution of an understanding of SCC, emphasis has shifted from controlling dissolved oxygen, to corrosion potential (the more fundamental parameter), to crack tip chemistry (a still more fundamental parameter). Dissolved oxygen (and other oxidants and reductants as well as other factors, such as flow rate) establish the corrosion potential; corrosion potential, in turn, alters the crack chemistry by concentrating anions and shifting the pH. Thus, control of the crack tip pH represents the most fundamental method of controlling the environmental component of SCC. If reasonable approaches for limiting the shift in pH in the crack are identified, SCC could be greatly decreased and become completely independent of the dissolved oxygen concentration or the corrosion potential.

SUMMARY OF THE INVENTION

The present invention is a method for controlling stress corrosion cracking of metal components by identifying and acting on the fundamental cause of accelerated environmental crack growth in high-temperature water, i.e., the solution pH in the crack. The evolution of our understanding of SCC has shifted from an emphasis on dissolved oxygen per se to corrosion potential, which controls susceptibility to SCC. At a given oxygen level, high flow rate tends to increase, while noble metal coatings can decrease the corrosion potential. Elevated corrosion potential causes a concentration of anions as well as shifts the pH in the crack. However, experiments have shown that it is not the corrosion potential per se which enhances SCC, but rather the effect of corrosion potential on crack tip pH. Thus, methods to limit the shift in pH in the crack can greatly decrease SCC completely independent of the dissolved oxygen concentration or the corrosion potential.

In accordance with the invention, propagation of a surface-connected crack or initiation of a crack at a crevice submerged in high-temperature bulk water is mitigated by managing the pH of the high-temperature water inside the crack or crevice. The method for mitigating propagation of a crack in a surface of a metal component submerged in high-temperature bulk water comprises the step of injecting a solution of pH-adjusting compound into the bulk water. The pH-adjusting compound has the ability to change the pH of high-temperature water inside the crack from a pH which produces a relatively high rate of crack growth to a pH which produces a relatively low rate of crack growth, without causing any significant change of the bulk water pH.

Approaches for managing the pH inside a crack or crevice in a boiling water reactor vary from the use of chemical buffering agents to tailored water chemistry (i.e., controlled additions of an acid or base, depending on the anionic species in the water). Ideally, the species should have minimal impact on low-temperature conductivity (so that radwaste from increased demineralizer loading will not increase significantly) and should dissociate preferentially in high-temperature water.

The advantages of this overall approach could include: (1) lack of concern for corrosion potential or the associated oxidizing species; (2) decreased emphasis on anionic impurities, since their effect on crack chemistry (pH) would be directly controlled; and (3) possible reduction in the flow through the reactor water cleanup system, which typically represents 1–3% of reactor water flow and has an impact on the overall thermal efficiency.

In accordance with a preferred method of the invention, the special characteristics of the differential aeration crevice, i.e., anion concentration and low internal corrosion potential, can be used as the basis of the solution to the problem of controlling the crack pH. As an example, a nitrate solution can be injected into the reactor bulk water to achieve a desired pH in the high-temperature water inside a crack in a reactor component. The nitrate anion ($NO_3^-$) will be acted on by the potential gradient along the crack, causing an elevation of its concentration in the crack. However, once it migrates into the crack, where the potential is low and therefore the environment is more reducing, the nitrate anion is reduced to ammonia. Ammonia is itself a buffer whose pH in 250° to 300° C. water is about 6.2 for a 25 ppm concentration.

Assuming a typical 30x enhancement (above the bulk nitrate level) by the potential gradient, a 25 ppm ammonia level would be achieved inside the crack at about a 1 ppm nitrate level in the bulk water. Since some fraction of the ammonia formed in the crack dissociates to ammonium cation and hydroxyl anion ($NH_4OH=NH_4^+ +OH^-$), and since the ammonium cation will tend to be expelled from the crevice under the action of the potential gradient, it is expected that the nitrate level would be increased, e.g., from 1 to 3–5 ppm.

To achieve the desired pH as a function of temperature, of the presence of other impurities in the water, etc., the nitrate concentration could be varied over a significant range, e.g., from <0.1 to >10 ppm. This would have a much lower than proportional effect on pH, because ammonia is a buffer (that is, any increase in the total ammonia concentration raises the ammonium cation and hydroxyl anion concentration by a much smaller amount, since not all ammonia dissociates to form those ions).

DETAILED DESCRIPTION OF THE PREFERRED EMBODIMENTS

Before disclosing the best modes of practicing the invention, certain basic concepts will be explained in order to facilitate understanding of the invention.

The pH of aqueous solutions can change dramatically with temperature. In particular, the pH of high-temperature water is generally quite different than that at low temperature. However, the pH of an aqueous solution is not solely a function of temperature, but also other variables such as the composition of species dissolved in the solution. Even the direction of pH change varies from species to species. For example, the pH of neutral (e.g., ultra high purity) water is 7.0 at 25° C., about 6.2 at 100° C., and about 5.63 at 288° C., an overall change in [$H^+$] of 25 times (pH is $-\log$ [$H^+$]). The variation of pH in pure water is not even monotonic, but reaches a minimum at about 270° C. and then begins to increase again. In contrast, a significant increase in pH vs. temperature occurs for some species. For example, 0.01M $NaHSO_4$ is roughly 2.4 pH at 25° C., but rises to roughly 6 at 300° C. because of the poor second ionization of sulfate ($HSO_4^- = H^+ + SO_4^{2-}$). Note that the change in pH vs. temperature for a $NaHSO_4$ solution is opposite to that of pure water. Other species, including some buffers, shift acidic with temperature. For example, the pH of low concentrations of ammonia (e.g., 40 ppm) at low temperature is about 10.3, but is about 6.2 at 288° C.

Figure 11:
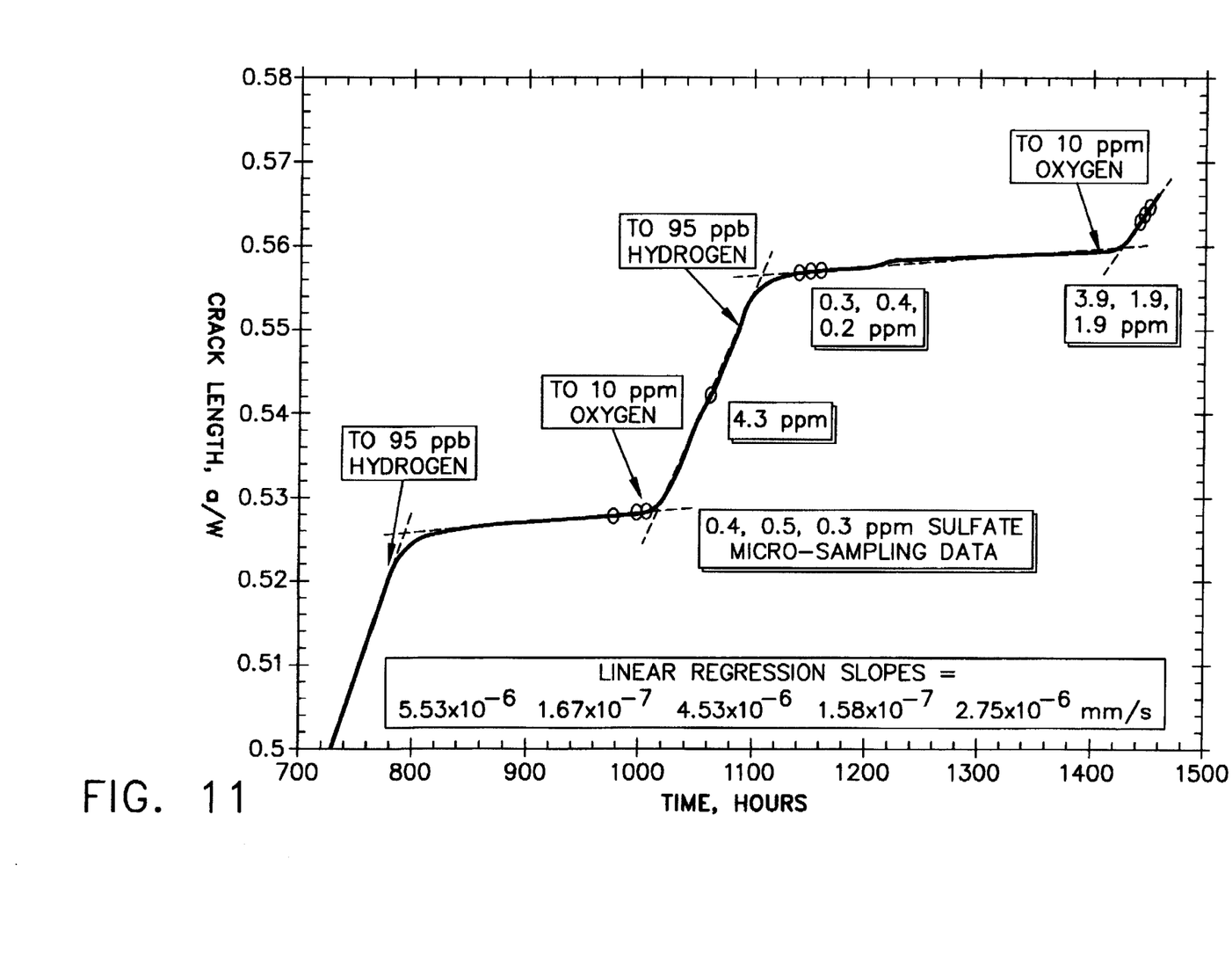
FIG. 11 is a graph showing crack growth and crack chemistry for low alloy steel in external water having <1 ppb sulfate.

The concentration of species and pH of solution would be constant everywhere in water were it not for concentrating mechanisms. For example, the pH inside a crack tip may vary markedly from the pH in the bulk reactor coolant. The simplest conceptual mechanism is localized dissolution in an occluded region (crack/crevice), which occurs in low alloy and carbon steels as a result of dissolution of MnS inclusion. The slightly elevated crack/crevice chemistry (to several ppm S) is sufficient to create conditions that increase stress corrosion crack growth rates by up to several orders of magnitude (see FIG. 11). Another common mechanism is boiling, which can produce huge differences in chemistry in regions where mass transport is restricted. Thermal gradients (non-boiling conditions) can also produce very large changes in chemistry in occluded regions. Shifts of several orders of magnitude are estimated under some conditions in light water reactors. Potential gradients are the most common concentrating mechanism in boiling water reactors. Because oxygen is consumed in the crevice, the corrosion potential is much lower than outside the crevice. This creates a potential gradient that causes anions (e.g., chloride, sulfate or hydroxide) to move into the crevice, and cations (e.g., sodium) to move out of the crevice. In general, if an anion other than hydroxide is present, it will permit acidification in the crevice, since it can "support" (charge balance) the additional $H^+$ associated with acidification. If the only anion present is hydroxide (but cations other than $H^+$ are present), then only an upward shift in pH (alkalinization) can occur.

Figure 12:
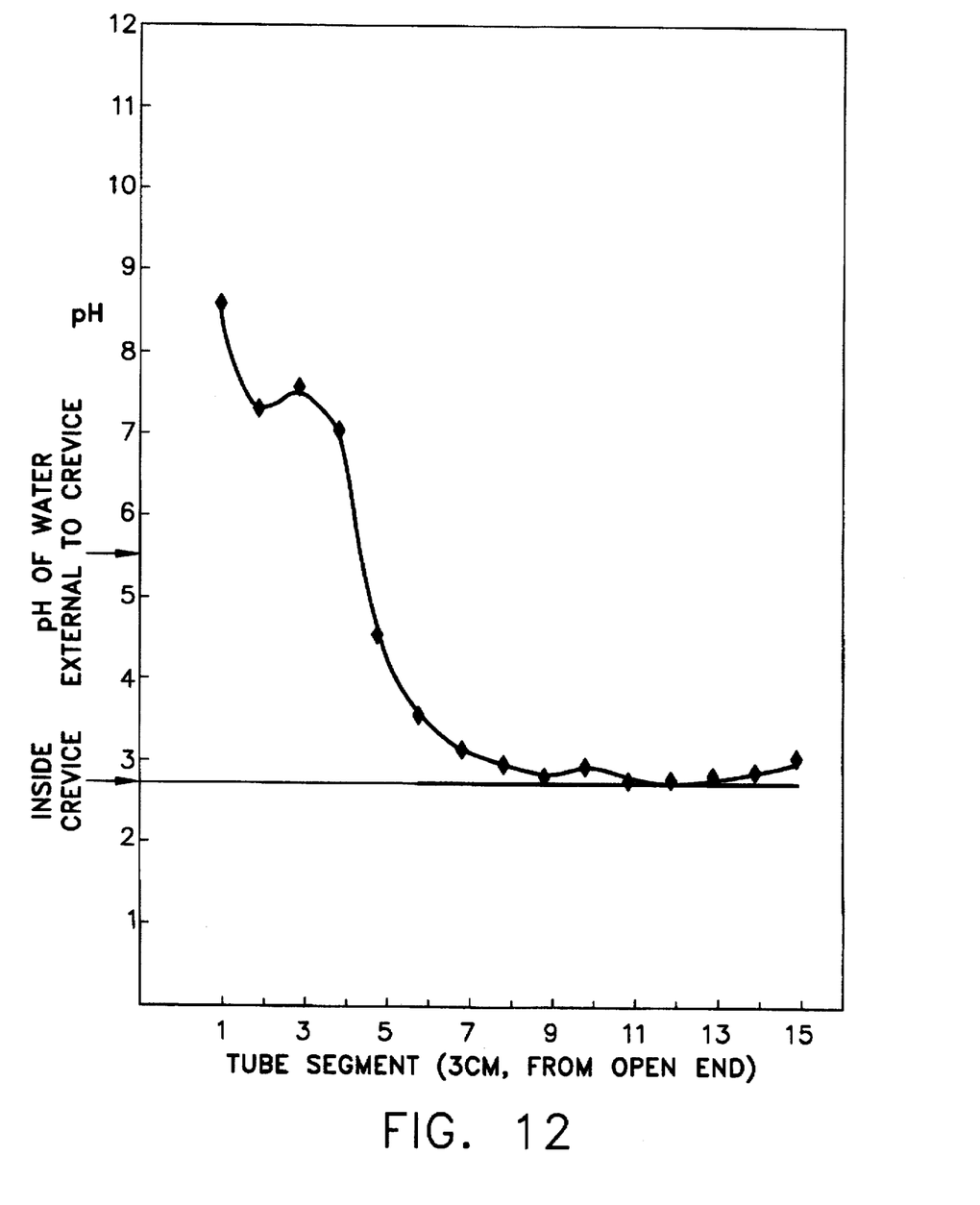
FIG. 12 is a graph showing changes in the interior crevice chemistry vs. distance into a 1-mm-inside diameter tube of as-received Alloy 600 initially filled with a high concentration (0.2N) of $Na_2SO_4$ and exposed to 288° C. aerated water. The line denotes the predicted value of pH.
Figure 13:
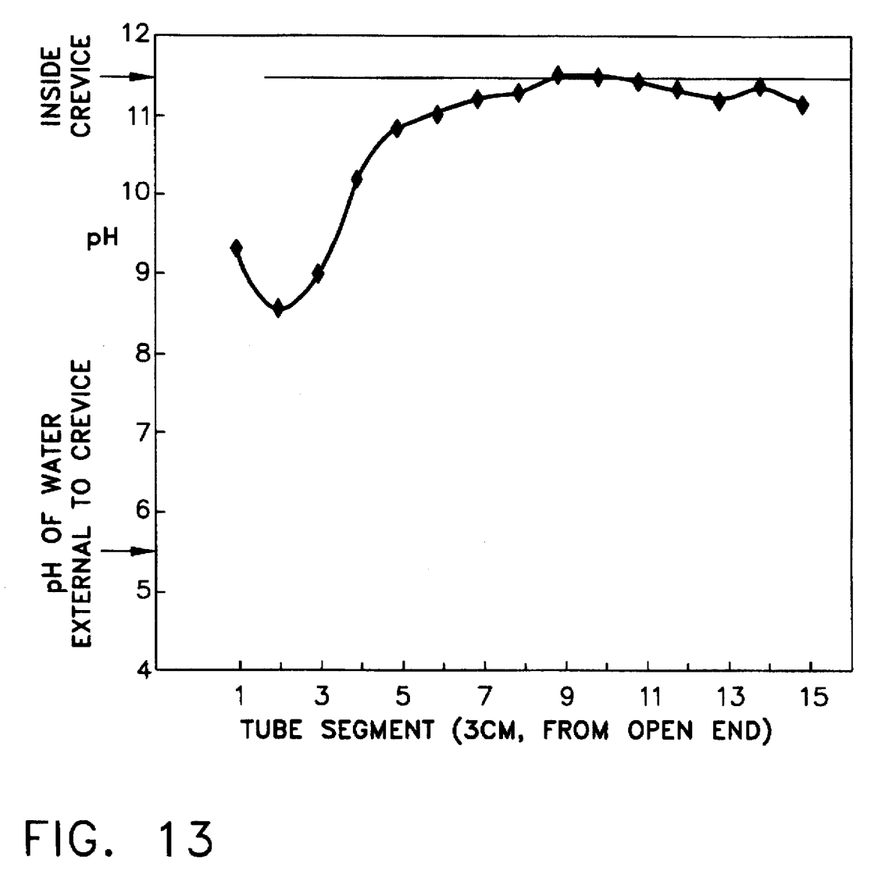
FIG. 13 is a graph showing changes in the interior crevice chemistry vs. distance into a 1-mm-inside diameter tube of solution annealed Alloy 600 initially filled with a high concentration (0.2N) of $NaNO_3$ and exposed to 288° C. deaerated (<40 ppb oxygen) pure water.

Measurements made in crevice tubes exposed to 288° C. water by D. F. Taylor showed that a significantly different concentration and pH could persist in differential aeration cells. Steady-state behavior was often achieved in less than a day, and his experiments were often run for a week or more, and showed an external pH of 5.5, with an internal pH of <1.0 in some cases; in other cases, the internal pH was as high as 11 (see FIGS. 12 and 13).

At concentrations more representative of typical BWR operating conditions, Andresen showed that the potential gradient caused typically a factor of 30x increase in anion concentration in a growing stress corrosion crack. [Reported in "Modeling of Water and Material Chemistry Effects on Crack Tip Chemistry and Resulting Crack Growth Kinetics", Proc. 3rd Int. Conf., Degradation of Materials in Nuclear Power Industry, Traverse City, Mich., Aug. 31-Sep. 4, 1987.] This was true for low alloy steels, where the anion results from dissolution of MnS inclusions internal to the crack, as well as stainless steel, where anions are associated with impurities that are intentionally added to the bulk water at very low concentrations. A factor of 30x is not huge, particularly when the relevant impurity levels are low to begin with (e.g., $10^{-7}$M), and can give rise to pH shifts inside the crack that are less than about 1.5 units away from the bulk, essentially neutral water. However, this difference is sufficient to induce huge changes in crack growth rate, e.g., by a factor of more than 100-1000 times. It is this condition (pH) within the crack that the method of the present invention seeks to control (see FIG. 11).

In accordance with the preferred embodiments of the invention, propagation of a crack in a metal component immersed in high-temperature water can be mitigated by controlling the solution pH inside the crack. In the case of a water-cooled nuclear reactor, e.g., a BWR, the pH inside the crack can be controlled by adding a pH-adjusting agent to the circulating water, e.g., by injecting a solution or suspension of the agent into the feedwater. The pH-adjusting agent can take the form of a chemical buffering agent or an acid or base, depending on the magnitude and direction of the required shift in pH. As used hereinafter, the term "solution" means a solution or a suspension.

The susceptibility of metal components in high-temperature water to SCC is correlated to elevated corrosion potentials. Elevated corrosion potential causes concentration of anions as well as shifts the pH in the crack. It is the effect of corrosion potential on crack tip pH which enhances SCC. The following logic establishes the fundamental importance of crack tip pH.

Figure 3:
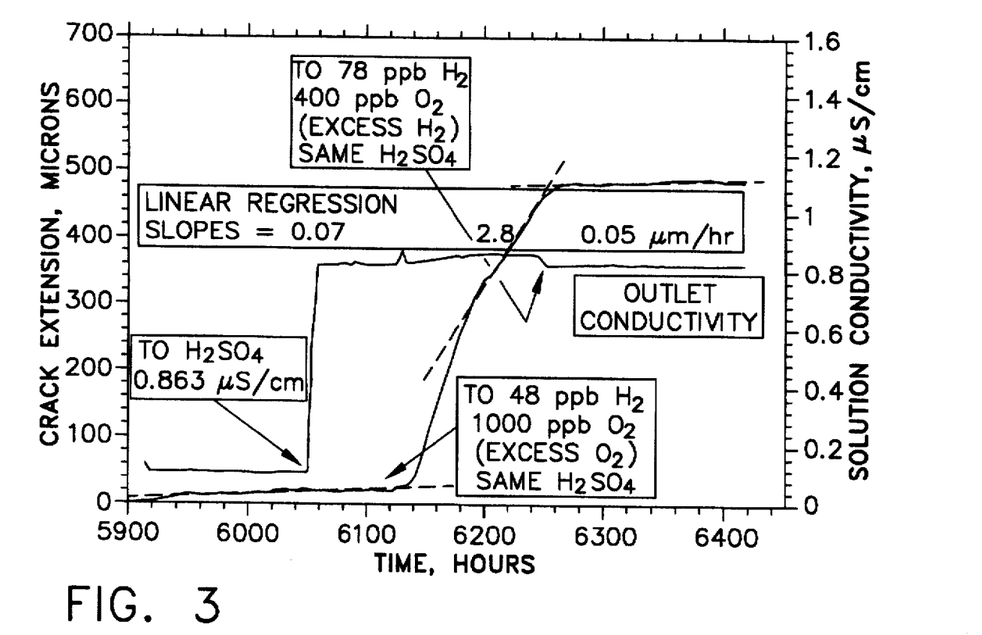
FIG. 3 is a plot of crack length vs. time for a Pd-coated CT specimen of sensitized Type 304 stainless steel.

The corrosion potential (on external surfaces) and (bulk) solution conductivity interact to create a specific crack chemistry. Thus, a given crack chemistry can be achieved by different combinations of potential and conductivity, i.e., high potential, moderately low conductivity can give the same crack chemistry as theoretically low potential, but high conductivity. Both analytical and experimental modeling exist to demonstrate these basic interactions, although the precise relationships over the entire range of potential and conductivity levels (and types) are not fully quantified/confirmed either analytically or experimentally. FIGS. 1 and 3 show examples of differing sensitivity to, e.g., conductivity as a function of corrosion potential.

In particular, FIG. 3 is a plot of crack length vs. time for a Pd-coated CT specimen of sensitized Type 304 stainless steel showing the increased tolerance to high impurity levels (0.1 µM $H_2SO_4$, or 0.863 µS/cm) at 33 MPa√m when a low corrosion potential (which results from stoichiometric excess hydrogen, i.e., 78 ppb $H_2$) is maintained on a catalytic surface, despite the presence of 400 ppb oxygen. On changing to excess oxygen at 6124 hr, the corrosion potential and growth rate increase dramatically; returning to excess hydrogen at 6244 hr causes the corrosion potential and growth rate to again drop.

Figure 4:
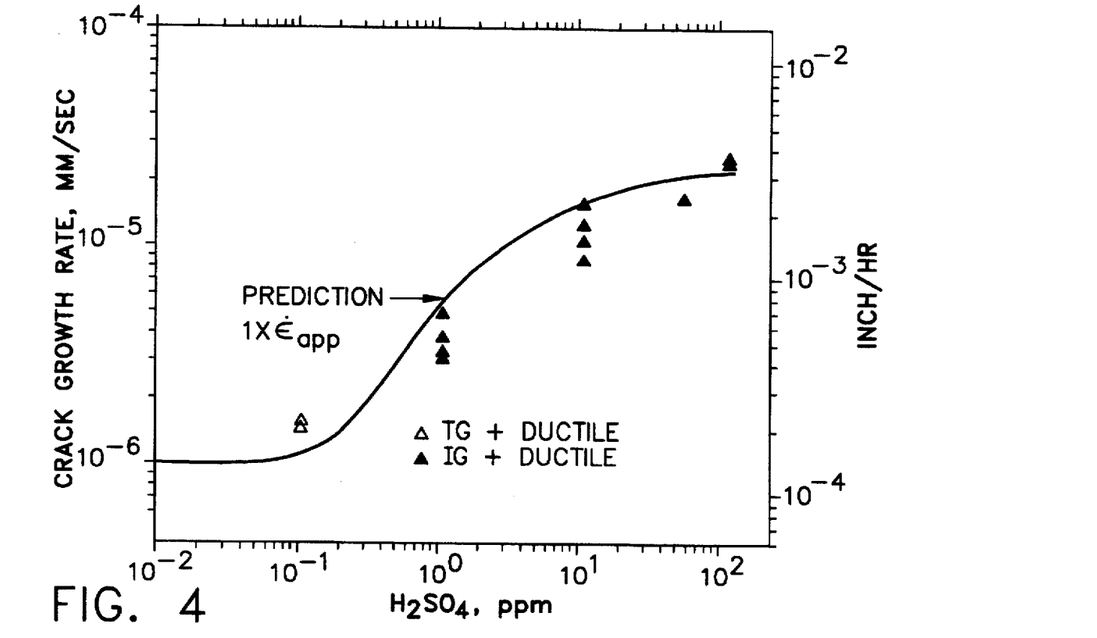
FIG. 4 shows the effect of $H_2SO_4$ additions on the crack growth rate of sensitized Type 304 stainless steel tested in deaerated, 289° C. water.
Figure 5:
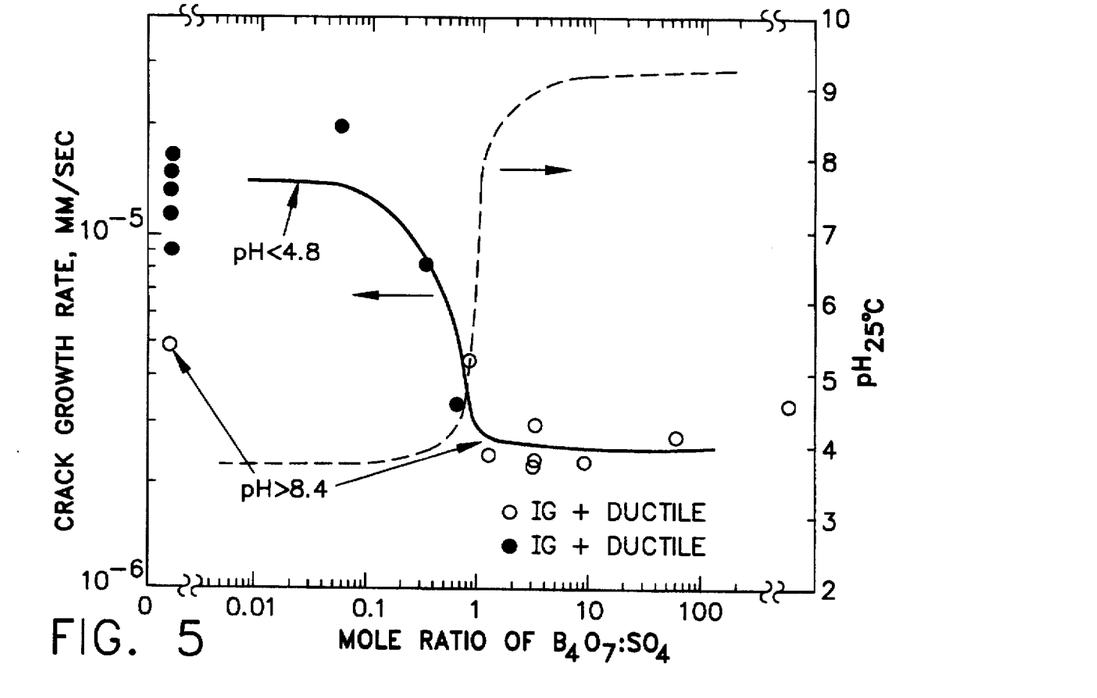
FIG. 5 shows the influence of the borate:sulfate mole ratio on the crack growth rate of sensitized Type 304 stainless steel tested in deaerated, 289° C. water with $H_2SO_4$.
Figure 6:
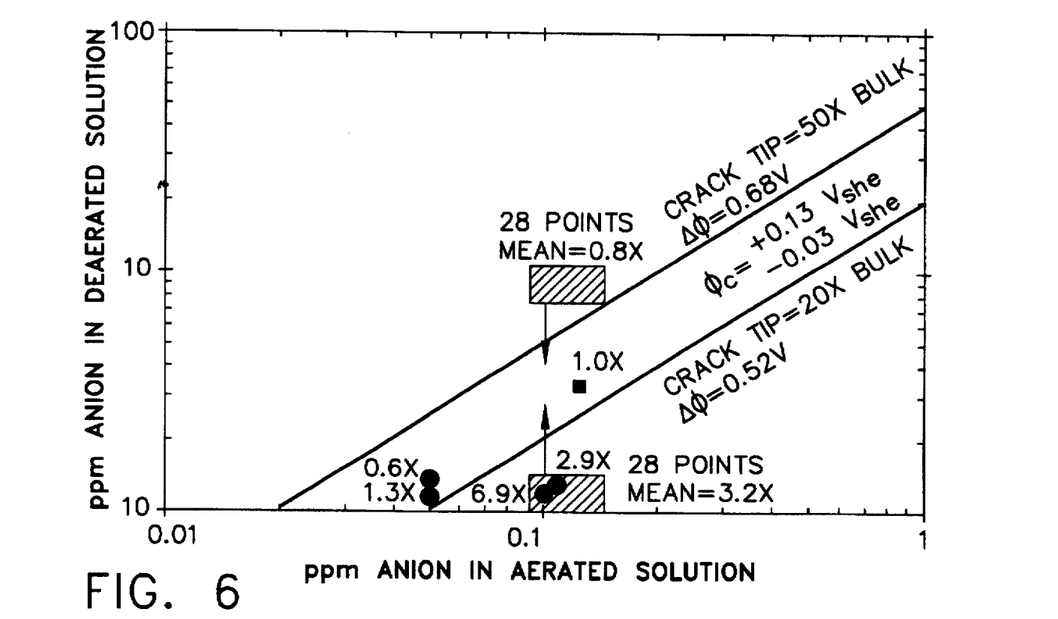
FIG. 6 shows the interrelationship between corrosion potential and solution conductivity in establishing a crack tip anion activity by comparing crack growth rates in aerated vs. deaerated solutions.

FIG. 3 shows that at low potential (generated under excess hydrogen, but moderately high oxygen, conditions on a Pd-coated CT specimen), the tolerance to impurities is dramatically higher than at elevated corrosion potentials. However, even at low potential, the addition of sufficient impurity causes an increase in crack growth rate (see FIGS. 4 to 6). FIG. 4 shows the effect of $H_2SO_4$ additions on the crack growth rate of sensitized Type 304 stainless steel tested in deaerated, 289° C. water with $\phi_c = -0.6$ $V_{SHE}$ in slow strain rate experiments at $1 \times 10^{-6}$ sec$^{-1}$. FIG. 5 shows the influence of the borate:sulfate mole ratio on the crack growth rate of sensitized Type 304 stainless steel tested in deaerated, 289° C. water with 0.3–10 ppm $H_2SO_4$ in slow strain rate experiments at $1 \times 10^{-6}$ sec$^{-1}$. FIG. 6 shows the interrelationship between corrosion potential and solution conductivity in establishing a crack tip anion activity by comparing crack growth rates in aerated vs. deaerated solutions for stainless steel and Alloy 82 at 288° C. If the growth rates under two conditions are similar, then it is inferred that the crack tip chemistries are similar. Each point represents a pair of datum obtained at similar crack growth rates and loading conditions for stainless steel and Alloy 82 in 288° C. water. Since perfect matches, requiring identical crack growth rates under aerated and deaerated conditions, were generally unavailable, the labels (e.g., 2.9x) indicate the ratio of the crack growth rate in aerated vs. deaerated solutions. The arrows indicate where points would shift if the growth rate match were perfect. In a deaerated solution, the ppm of anion is about equal in the bulk solution and at the crack tip.

Crack growth rate is controlled by the crack chemistry, not, e.g., by the external potential per se. While some crack growth models depend on the cathodic reduction of oxygen at the mouth of the crack, elevated corrosion potential is unnecessary. The best data to demonstrate this point comes from slow strain rate tests by Shack et al., reported in "Environmental Assisted Cracking in Light Water Reactors", Semiannual Report, April–September 1985, NUREG/CR-4667, Vol. 1, and CT tests by Andresen, reported in "Modeling of Water and Material Chemistry Effects on Crack Tip Chemistry and Resulting Crack Growth Kinetics", Proc. 3rd Int. Conf., Degradation of Materials in Nuclear Power Industry, Traverse City, Mich., Aug. 31–Sep. 4, 1987. Data from Shack et al. appear in FIGS. 4–6 herein; data from Andresen appear in FIGS. 6 and 7 herein. The data show conclusively that high growth rates can be achieved at $-0.5$ $V_{SHE}$ if an acidic addition is made to a level of ≈10 µs/cm. Shack et al. have shown this on sensitized stainless steel; Andresen has shown it on sensitized and non-sensitized stainless steel and Alloy 82 weld metal. The enhancement is not subtle: growth rates as high as in aerated water can be attained.

Cracking responds to changes in the pH of the solution at the crack tip, not, e.g., the sulfate activity per se. Increases in growth rate on sensitized stainless steel have been shown by Andresen to occur for shifts to either lower (see data in FIGS. 4–6 and 7A–7C) or higher pH (see data in FIG. 8, although more pH shift is needed for NaOH than for $H_2SO_4$). Also, both Shack et al. and Andresen (see data in FIGS. 4–6 and 7A–7C) have performed tests which show that, in fully deaerated water, crack growth rate enhancement occurs for acidic additions ($H_2SO_4$), but not for more neutral additions (e.g., $Na_2SO_4$, which shifts somewhat basic in 288° C. water). Shack et al. also did tests with mixtures of borate and $H_2SO_4$ and showed that only when the buffering capability of borate was overcome did the growth rate increase (see data in FIGS. 7A–7C).

Figure 7A:
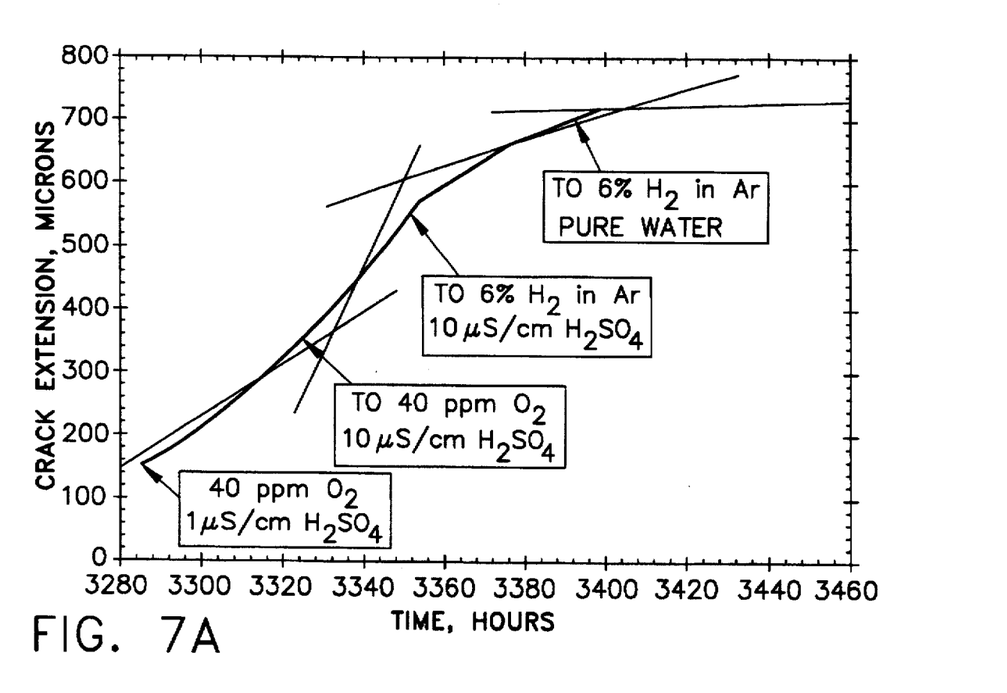
FIGS. 7A and 7B are respectively plots of the crack extension vs. time response of non-sensitized Type 304L stainless steel and Alloy 82 weld metal to changes in water chemistry.
Figure 7B:
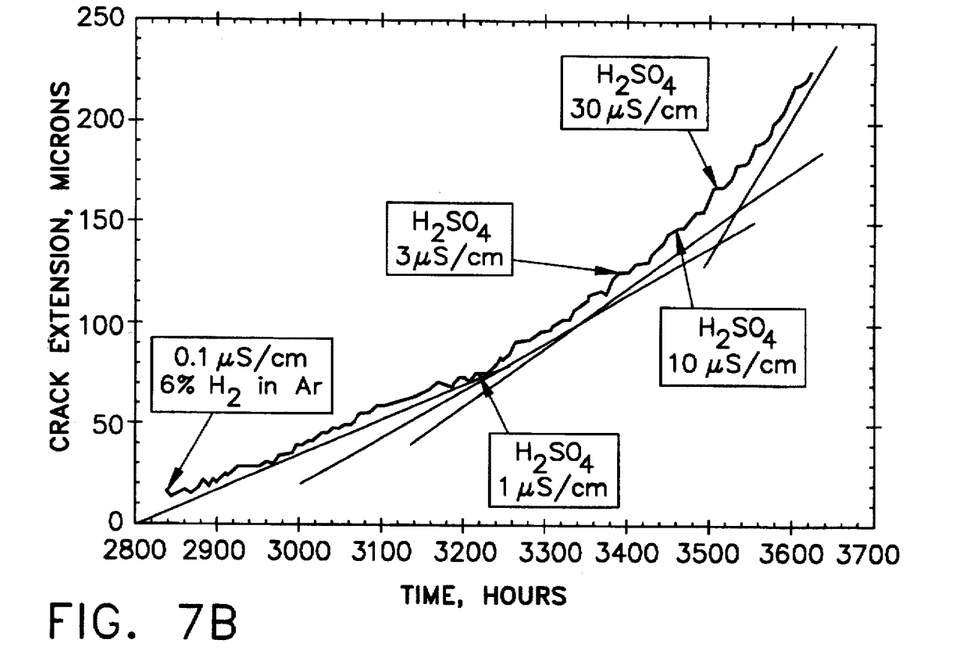
Figure 7C:
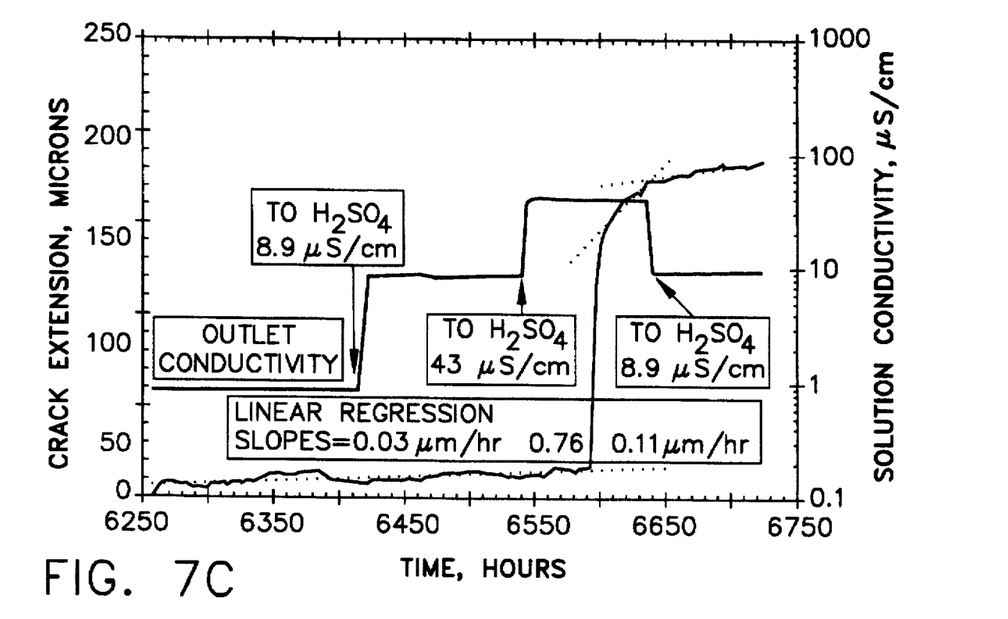
FIG. 7C is a plot of crack length vs. time for a Pd-coated CT specimen of sensitized Type 304 stainless steel showing that accelerated crack growth can be achieved at the thermodynamically lowest potentials provided that sufficient $H_2SO_4$ is added.
Figure 8:
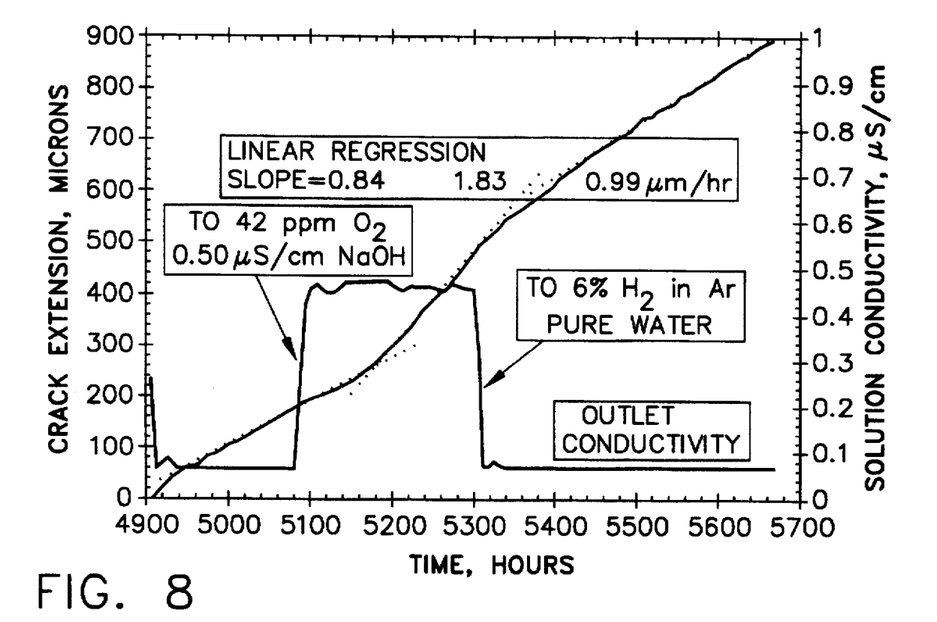
FIG. 8 is a plot of crack extension vs. time for sensitized Type 304 stainless steel in 288° C. water showing the effect of various concentrations of $OH^-$ as NaOH.

FIGS. 7A and 7B are respectively plots of the crack extension vs. time response of non-sensitized Type 304L stainless steel and Alloy 82 weld metal to changes in water chemistry showing elevated crack growth rates in the non-sensitized material in deaerated water at high conductivities. This illustrates the interrelationship between solution conductivity and corrosion potential in creating a specific crack tip solution chemistry and thus a specific crack growth rate. The straight line segments represent predictions of crack growth rate behavior for the various conditions shown. FIG. 7C is a plot of crack length vs. time for a Pd-coated CT specimen of sensitized Type 304 stainless steel showing that accelerated crack growth can be achieved at the thermodynamically lowest potentials (characteristic of fully deaerated water, or catalytic surfaces in excess hydrogen, i.e., 78 ppb $H_2$, with 400 ppb $O_2$) provided that sufficient $H_2SO_4$ is added. This also shows that low corrosion potentials provide a large tolerance to impurities since, at high corrosion potentials, effects on crack growth of ≈0.1 µM $H_2SO_4$ are readily observed. FIG. 8 is a plot of crack extension vs. time for sensitized Type 304 stainless steel in 288° C. water showing the effect of various concentrations of OH$^-$ as NaOH.

Note that in deaerated water there is no acidification mechanism (no gradient in corrosion potential in the crack), so that an acidic impurity must be used. In aerated water, $Na_2SO_4$ will acidify within the crack to $H_2SO_4$, as directly shown by Taylor et al., reported in "High-Temperature Aqueous Crevice Corrosion in Alloy 600 and 304L Stainless Steel", Proc. Conf. on Localized Crack Chemistry and Mechanics of Environmentally Assisted Cracking, AIME, Philadelphia, Oct. 1983. Taylor et al. also showed that shifts toward elevated pH occur in pure water, NaOH, etc.

Figure 9A:
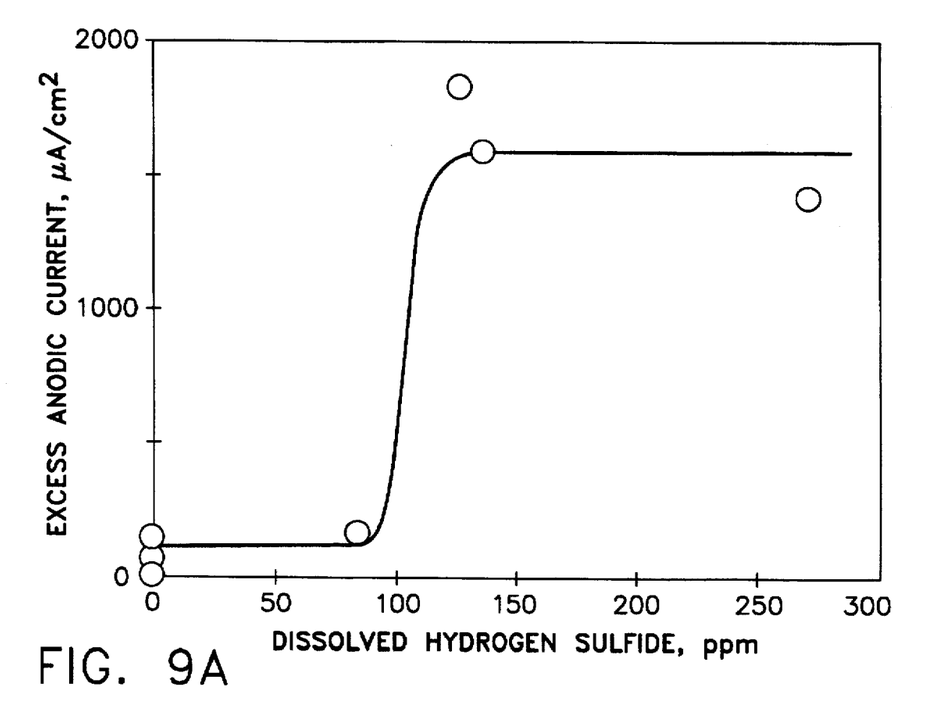
FIGS. 9A and 9B respectively show the effects of sulfide concentration on the excess anodic current density (metal dissolution rate) and slow strain rate behavior of Alloy 600.
Figure 9B:
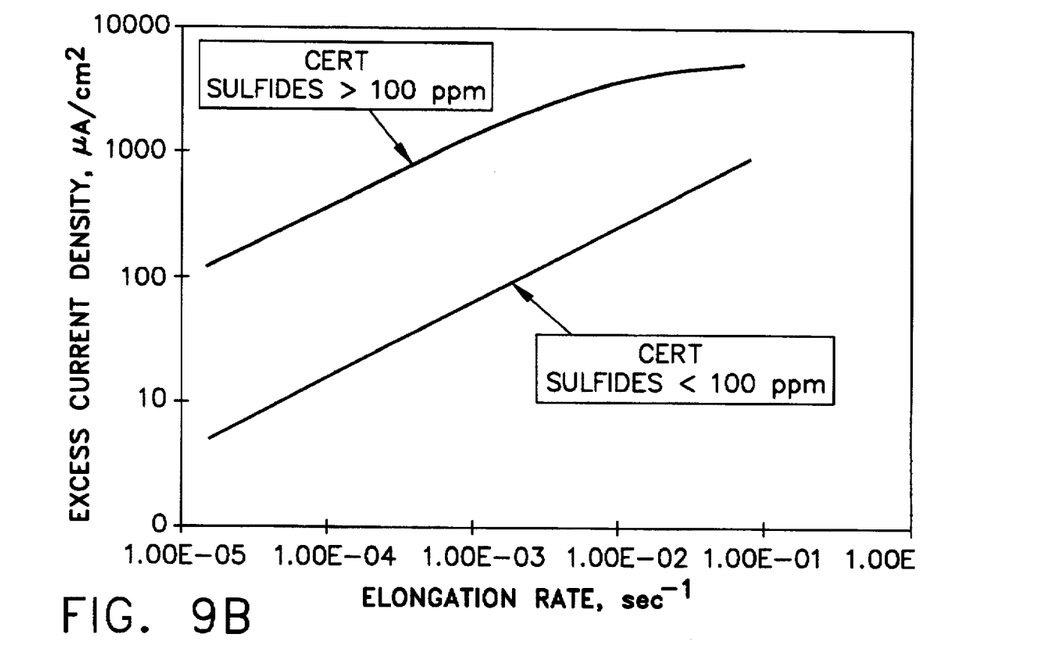

While cracking can occur if the pH is shifted down or up, enhanced growth rates require a larger shift basic than acidic. This is based on data gathered by Andresen on sensitized stainless steel with NaOH additions, reported in "Effects of Specific Anionic Impurities on Environmental Cracking of Austenitic Materials in 288° C. Water". Note, however, that at high pH, reduction of sulfate, sulfite, etc. to sulfide ($S^{2-}$) becomes important. It has been shown that sulfide levels above ≈100 ppm in the crack cause depassivation and accelerated crack growth rates. FIGS. 9A and 9B respectively show the effects of sulfide concentration on the excess anodic current density (metal dissolution rate) and slow strain rate behavior of Alloy 600. A steep threshold at ≈100 ppm sulfide is shown. The test conditions were as follows: 7500 ppm B, pH=7, 290° C. For FIG. 9A, the strain rate was $2 \times 10^{-3}$ sec$^{-1}$. For FIG. 9B, the applied potential was $-720$ mV$_{SHE}$.

Thus, by controlling the crack pH, the lowest possible crack growth rates are achievable for a given material, loading and temperature.

Figure 10:
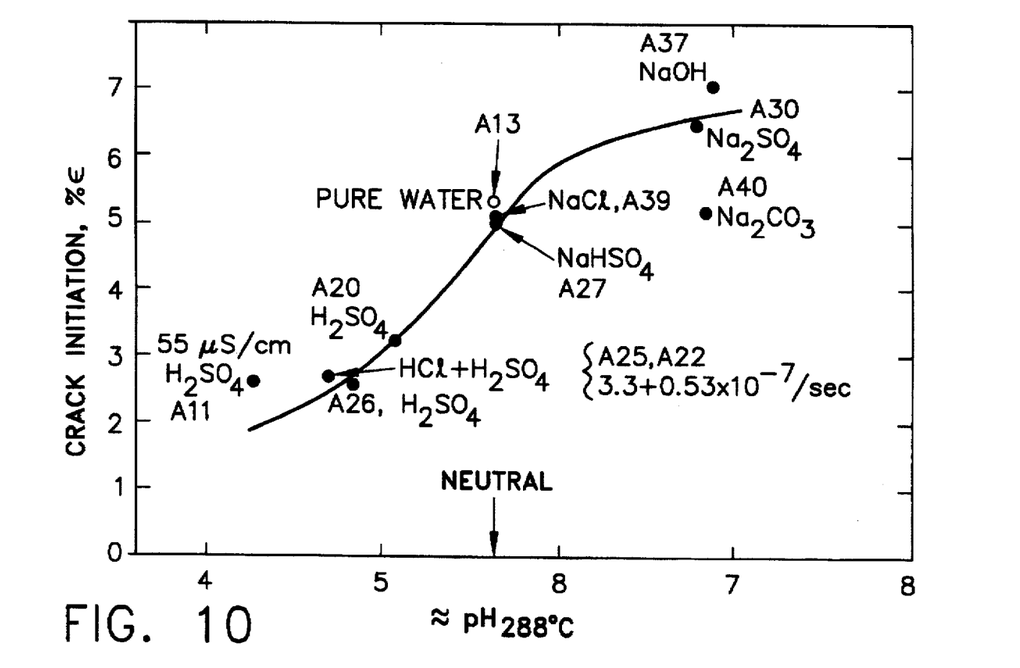
FIG. 10 shows the effect of impurities on crack initiation as measured during slow strain rate testing of sensitized Type 304 stainless steel in 288° C. water with 200 ppb $O_2$.

Interrupted slow strain rate crack initiation tests performed on smooth specimens by Andresen and reported in "The Effects of Aqueous Impurities on Intergranular Stress Corrosion Cracking of Sensitized Type-304 Stainless Steel", EPRI NP-3384, Final Report, Nov. 1983, show higher strains to crack initiation for basic impurities and lower strains to crack initiation for acidic impurities. FIG. 10 shows the effect of 10 µs/cm of impurities on crack initiation as measured by repeated interruption during slow strain rate testing ($3.3 \times 10^{-7}$ sec$^{-1}$) of sensitized Type 304 stainless steel in 288° C. water with 200 ppb $O_2$. The results correlated poorly with impurity level (or solution conductivity), but show good correlation with (approximate) pH at test temperature. Andresen et al. have also done work, reported in "Behavior of Short Cracks in Stainless Steel at 288° C.", Paper No. 495, Corrosion 90, NACE, Las Vegas, Nev., which shows that short cracks behave like long cracks (i.e., become deaerated within, and have high anion concentrations at the tip) once they reach a depth of 20 to 50 µm and multiple cracks have coalesced into a larger crack. The issue of how cracks behave when they are very small and exposed to oxygen-containing water (something a bit closer to "initiation") is more complex. Thus, benefits of pH control apply to "smooth" surfaces, very short cracks, and long cracks.

In accordance with the preferred methods of the present invention, management of pH in the crack can be achieved by four related techniques (some of which rely on the presence of a gradient in corrosion potential):

I. If detailed knowledge exists of all of the anions and cations in the BWR water (some BWRs do measure species by on-line ion chromatography), then it is possible to "manually tune" the crack tip pH by adding precise concentrations of acidic, neutral, or alkaline species such that, upon concentration within the crack or crevice, the resulting pH falls within the desired range of 6.0 to 8.0. Such additions would, in most instances, cause the bulk water to be outside this pH range.

While obviously feasible in concept, this "manual" approach would be difficult because it would depend on an accurate knowledge of the concentration "mix" of all species in the BWR water, which can vary over relatively short times (hours). Minor variations in the concentration of some species could cause comparatively large changes in crack pH. Thus, while conceptually feasible, the use of some type of chemical buffer is preferred, as it provides a much broader tolerance to changes in the concentrations of impurities.

II. Use of a buffer to "overwhelm" the pH-changing effects of other anionic impurities that concentrate in the crack. Since only small changes in pH usually occur from anionic impurities such as sulfate and chloride (i.e., <1 to 1.5 pH units), the buffer does not need to be a strong buffer. Thus, an ideal example would be a compound that only weakly dissociates in high-temperature water. The advantage would be that, with the vast majority of the compound in non-ionized form, it would not itself concentrate in the crack very much under the action of the potential gradient. One example might be silicon hydroxide, which only dissociates by about 1% (Si(OH)$_4$=H$^+$+SiO(OH)$_3^-$). A small amount of base (such as sodium or lithium hydroxide at about 0.1% by weight of silicon hydroxide) would be added to "tune" the initial pH somewhat above neutral into the desired range.

III. Use of a more standard (stronger) buffer to "overwhelm" the pH-changing effects of other anionic impurities that concentrate in the crack. The greater ionic dissociation of this buffer would promote concentration in the crack of the anionic part of the buffer. An example is boric acid (H$_3$BO$_3$), whose pH is often "tuned" with lithium hydroxide, where the anion H$_3$BO$_2^-$ would concentrate in the crack. However, the charge-balancing cation formed in the crack is primarily H$^+$, which means that the balance of H$^+$ and H$_3$BO$_2^-$ is similar both inside and outside the crack.

Because significant dissociation occurs (H$_3$BO$_3$=H$^+$+H$_3$BO$_2^-$), the borate anion migrates under the action of the potential gradient, and therefore the concentration of the buffer in the crack would be higher than in the bulk. Further since only small changes in pH usually occur in BWRs (i.e., <1 to 1.5 pH units), the required buffering capacity does not need to be high. Thus, quite low concentrations of boric acid could be used in the bulk water (perhaps 0.1 to 10 ppm B, which is about 100 to 10,000 times lower than the level used in pressurized water reactors (PWRs), where boron serves as a neutron absorber). Proportionately less lithium-hydroxide would be used than typically used in PWRs (which is about 2000 ppm B as boric acid and 1.2 ppm Li as LiOH), because the fully ionized LiOH (Li$^+$ and OH$^-$) will concentrate in the crack more than the partially ionized boric acid. This should be sufficient to control the pH in the crack to within the specified range, i.e., 6.0 to 8.0. Other species, such as ammonium hydroxide or phosphates, can also be used.

IV. The fourth alternative is a method for controlling SCC by auto-buffering of the pH inside cracks. Its goal is to reduce cracking to a very low, minimum value independent of the corrosion potential and, to a reasonable extent, the presence of aggressive impurities such as sulfate and chloride. It involves the addition of a nitrate species (i.e., a salt, such as sodium, potassium, or lithium nitrate, or an acid, HNO$_3$) to BWR water. This addition would not significantly shift the pH of the bulk water; however, since the environment within cracks is deaerated and at low potential, the nitrate that diffuses into cracks will be reduced to ammonia, producing a localized increase in pH. In areas of great need (i.e., high corrosion potential), more buffering action occurs because more nitrate is concentrated into the crack. This increase in pH is self-buffering because of the equilibria between N$_3$, N$_4$OH, and N$_4^+$/OH$^-$. Thus, the nitrate (reduced to ammonia) provides protection (only) in the locations (cracks) where shifts in pH would otherwise occur (from anion concentration in the differential aeration "crevice" cell), thereby preventing a significant increase in the crack growth rate. The "auto-buffering" capability is associated with several characteristics of the system:

1. The presence of near-neutral nitrate species in the bulk water, which have been shown to be non-damaging to crack initiation.

2. The diffusion and ion migration (driven by the differential aeration "crevice" cell) of these species into incipient cracks, long cracks, and crevices cause an increase in their concentration above their bulk values. The consumption of oxygen near the mouth of the crack creates a low potential in the crack (this is the origin of the differential aeration "crevice" cell), and also causes reduction of nitrate to ammonia.

Thus, in regions of the BWR where the corrosion potentials (and dissolved oxygen and hydrogen peroxide concentrations) are highest and give rise to the highest SCC susceptibility, the concentration of ammonia in the crack is also highest. Thus, the buffer is formed where it is needed, and its concentration is automatically regulated by the very phenomenon that is most responsible for high SCC susceptibility.

A balance in mass transport kinetics occurs because just as nitrate is driven into the crack under the action of the potential gradient, so the ammonium cation is driven out of the crack. However, since the concentration of ammonium ion is lower than nitrate (non-ionic ammonia also forms), excess ammonium ion (and ammonia) will exist in the crack.

3. Unlike other species (e.g., NaOH), the pH in the crack will not rise in direct proportion to concentration, because the equilibria between $NH_3$, $N_4OH$, and $NH_4^+/OH^-$ provides a buffering action which should maintain a pH at temperature in the crack of between 6.0 and 6.5. The use of the ammonia equilibria is also attractive because of its relatively strong independence of temperature.

By contrast, while traditional pH buffers like boric acid and phosphate could accomplish a similar goal, they possess disadvantages such as higher concentrations for a given buffering capacity and undesirable nuclear consequences (i.e., neutron absorption by boron). Direct additions of ammonia have also been used (e.g., in PWRs) as a buffer; its disadvantages, compared to the preferred embodiment disclosed herein, include the need for a higher concentration (i.e., no benefit would derive from (lack of) concentration of this cation in the potential gradient, as opposed to the nitrate anion) and its volatility (large concentrations would have to be continuously added to compensate for its loss in the steam phase).

The addition of a nitrate salt to BWR water would not significantly shift the pH of the bulk water, although it could be combined with small additions of a strong base (e.g., sodium hydroxide) or weak base (e.g., zinc or manganese hydroxide) to cause a slight alkaline shift in pH. A slight increase in pH in the bulk water is desirable because it shifts the system toward a minimum in solubility for many oxides, which, in turn, can decrease the formation and release of crud deposits on the fuel.

The success of this approach depends on: (1) the reduction of nitrate to ammonia in the crack; (2) the presence of a concentration of nitrate/ammonia that is sufficiently in excess of other deleterious impurities (e.g., chloride and sulfate) so that the crack pH is maintained in the desired region; (3) stability of nitrate in bulk oxygenated BWR water, so that relatively little ammonia is lost to the steam phase; (4) the ability to measure/regulate the nitrate concentration, e.g., using anion exchange resins that are partially converted to a nitrate base (this maintains the nitrate concentration in the reactor water clean-up system).

The potential advantages of this overall approach include: (1) lack of concern for corrosion potential and the associated oxidizing species; (2) decreased emphasis on anionic impurities, since their effect on crack chemistry (pH) would be directly controlled (although they could not be permitted to rise to a level approaching that of nitrate); and (3) possible reduction in the flow through the reactor water clean-up system, which typically represents from 1 to 3% of reactor water flow and has an impact on the overall thermal efficiency.

Figure 14:
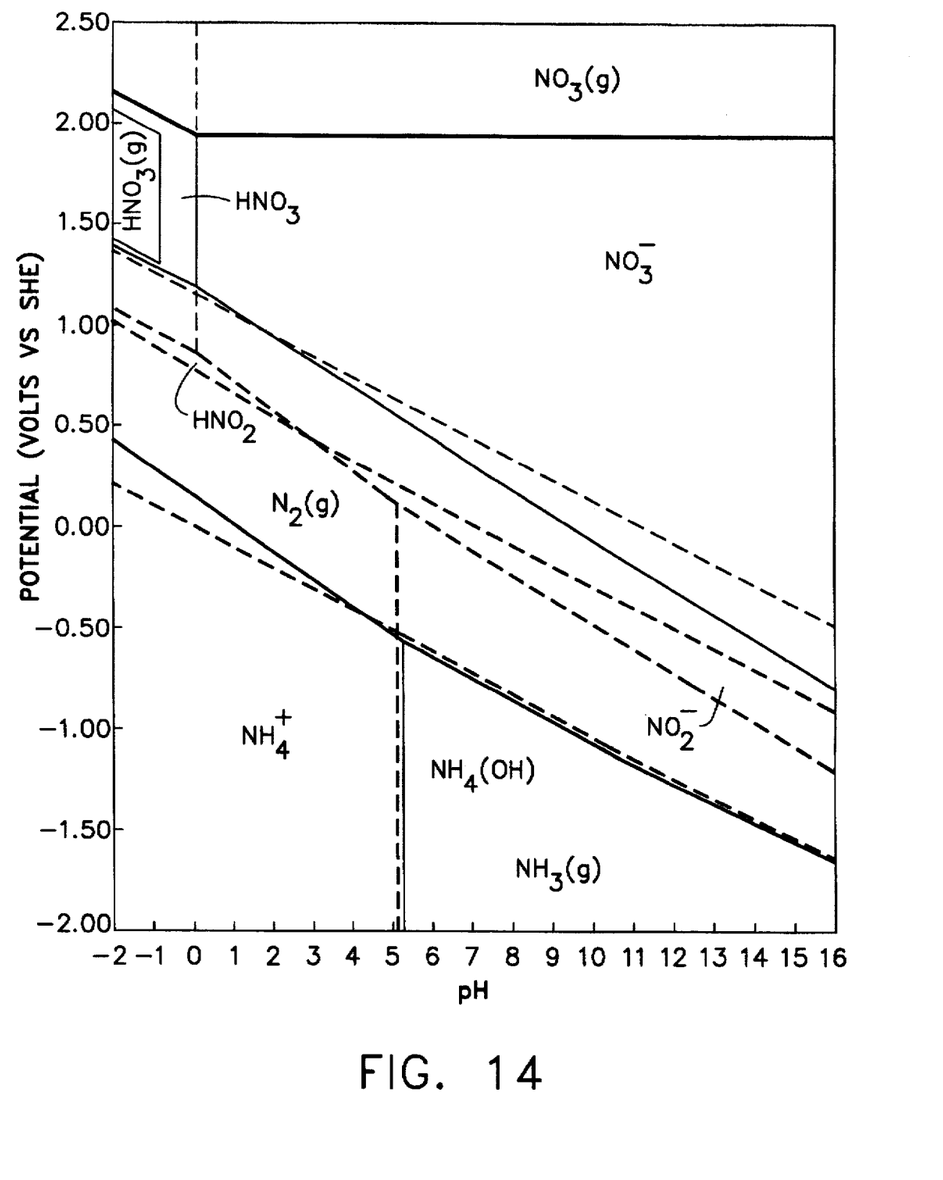
FIG. 14 is a potential vs. pH "Pourbaix" diagram of the nitrogen-water system at 250° C. showing the thermodynamic stability of ammonia over nitrate at low potentials.
Figure 15:
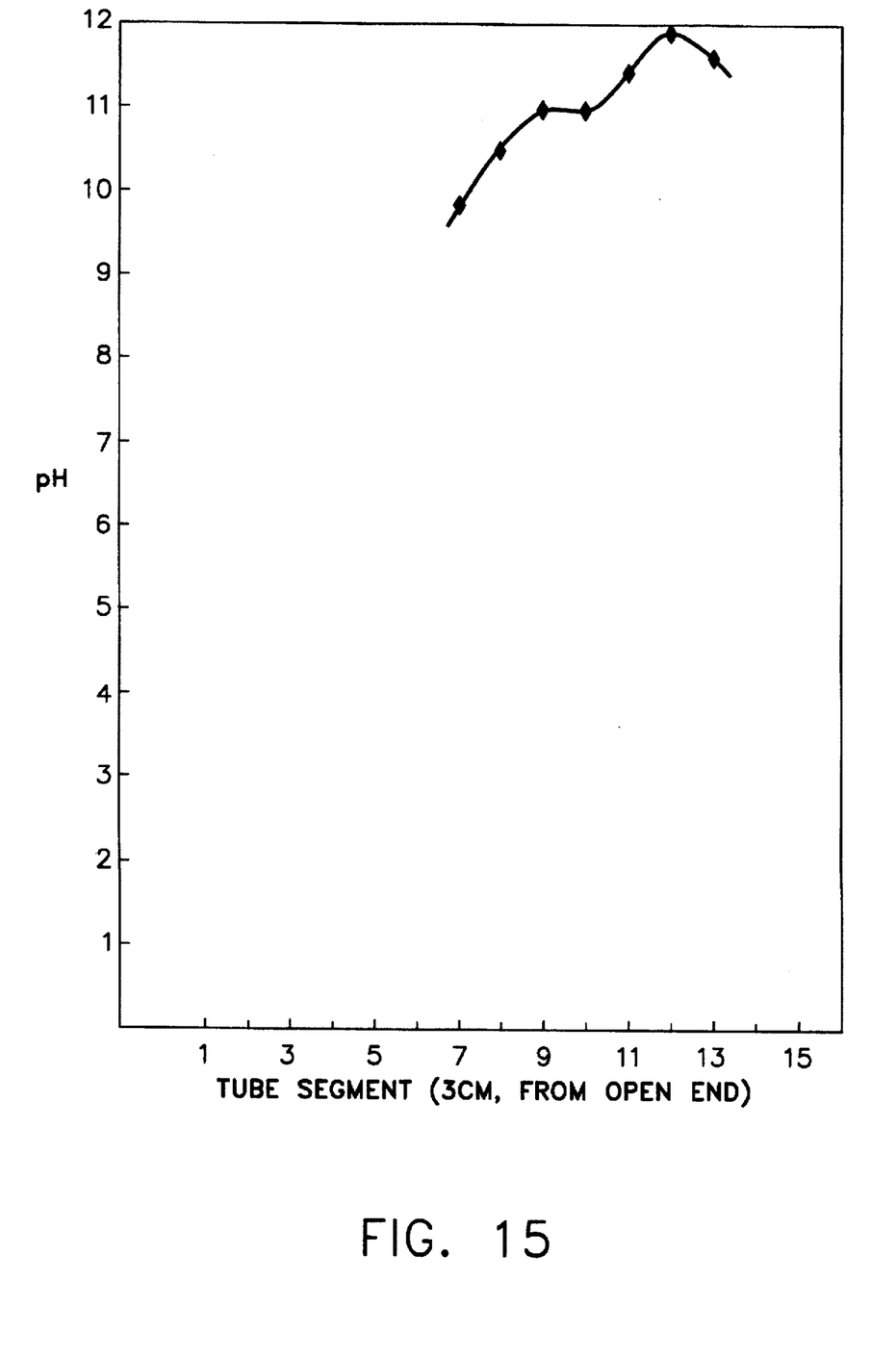
FIG. 15 is a graph showing changes in the interior crevice chemistry vs. distance into a 1-mm-inside diameter tube of solution annealed Type 304 stainless steel initially filled with a high concentration (0.2N) of $NANO_3$ and exposed to 288° C. deaerated (<40 ppb oxygen) pure water.

As shown in FIG. 14, below a redox potential of about $-0.3$ $V_{SHE}$, ammonia is the most stable species. However, the kinetics of nitrate reduction to ammonia are not very rapid, since it has been observed in "open" autoclaves that, following moderate exposures (average residence time of 20 to 30 minutes) in high-temperature deaerated water (containing 95 ppb hydrogen), little or no ammonia was formed. However, following a one week exposure in a 1-mm-ID crevice tube, Taylor observed the nearly complete reduction of nitrate to ammonia, with an associated increase in pH (see FIG. 15).

In summary, the concept of the present invention involves control of SCC by limiting shifts in crack pH in high-temperature water, i.e., within a range of about 6.0 to 8.0. This appears to correspond to the minimum in iron and nickel oxide solubility vs. pH in high-temperature water. The invention addresses a more fundamental issue in SCC than controlling dissolved oxygen or corrosion potential, since these latter items interact with the impurities in the bulk solution to generate a pH-shifted crack chemistry. If the pH is controlled, SCC can be greatly decreased completely independent of the dissolved oxygen concentration or the corrosion potential. Approaches for limiting shifts in pH range from chemical buffering agents (such as $NH_4OH$, $Na_xH_{(3-x)}PO_4$ and $H_3BO_3$) to tailored water chemistry, i.e., controlled additions of an acid (such as $H_3PO_4$, $C_2H_4OOH$, $C_2OOH$, $H_3BO_3$ and $H_2CO_3$) or a base (such as ZnO, NaOH, LiOH and KOH), depending on the anionic species in the water.

While it would be desirable to identify species which would not be needed in significant concentrations or would not significantly dissociate in low-temperature water (and thus would not be efficiently removed by, or reduce the operating life of demineralizers), it is also possible to reduce the fraction of reactor water which is purified in the reactor water cleanup system, because impurities (like corrosion potential) no longer influence SCC if the crack pH is controlled. It is also possible to "convert" the demineralizer so that it becomes, e.g., $NH_3^+$ based rather than $H^+$ based for cations.

The foregoing method has been disclosed for the purpose of illustration. Variations and modifications of the disclosed method will be readily apparent to practitioners skilled in the pertinent arts. All such variations and modifications are intended to be encompassed by the claims set forth hereinafter.

I claim:

1. A method for mitigating propagation of a surface-connected crack in a metal component submerged in the high-temperature bulk water of a boiling water reactor, said method comprising the step of injecting a solution of a compound selected from the group consisting of boric acid and silicon hydroxide into the bulk water, said compound having the property of changing the pH of high-temperature water inside the crack from a value outside a predetermined pH range to a value within said predetermined pH range, wherein the growth rate of the crack when the crack pH is outside said predetermined pH range is greater than the growth rate of the crack when the crack pH is within said predetermined range.

2. The method as defined in claim 1, wherein said predetermined pH range is 6.0 to 8.0.

3. The method as defined in claim 1, wherein said compound is boric acid.

4. The method as defined in claim 1, wherein said compound is silicon hydroxide.

5. The method as defined in claim 1, further comprising the step of adding a base to the bulk water to adjust the pH to above neutral.

6. The method as defined in claim 6, wherein said base is an hydroxide.

7. The method as defined in claim 6, wherein said base is a phosphate.

8. A method for mitigating initiation of a surface-connected crack at a crevice in a metal component submerged in the high-temperature bulk water of a boiling water reactor, said method comprising the step of injecting a solution of a compound selected from the group consisting of boric acid and silicon hydroxide into the bulk water, said compound having the property of changing the pH of high-temperature water inside the crevice from a value outside a predetermined pH range to a value within said predetermined pH range, wherein a crack is initiated at the crevice when the crevice pH is outside said predetermined pH range and the crack is not initiated at the crevice when the crevice pH is within said predetermined pH range.

* * * * *